United States Patent [19]
Valerino, Sr. et al.

[11] Patent Number: 5,901,966
[45] Date of Patent: May 11, 1999

[54] REMOVABLE GLIDE RINGS FOR PNEUMATIC TUBE CARRIERS

[76] Inventors: Fred M. Valerino, Sr., 327 Gailridge Rd., Timonium, Md. 21093; Joseph H. Gaultney, 112 Brandon Rd., Baltimore, Md. 21212

[21] Appl. No.: 08/632,019

[22] Filed: Apr. 15, 1996

[51] Int. Cl.⁶ .................................................. F16J 15/16
[52] U.S. Cl. ........................................ 277/548; 406/190
[58] Field of Search .............................. 406/190; 24/306, 24/304; 277/543, 548

[56] References Cited

U.S. PATENT DOCUMENTS

| | | | |
|---|---|---|---|
| 3,401,902 | 9/1968 | Gouyou-Beauchamps et al. | 243/34 |
| 3,593,948 | 7/1971 | McClellan | 243/34 |
| 3,825,210 | 7/1974 | Weaver | 243/34 |
| 4,149,685 | 4/1979 | Leavelle | 243/34 |
| 4,324,511 | 4/1982 | Irish | 406/189 |
| 5,368,417 | 11/1994 | Benjamin et al. | 406/111 |
| 5,538,366 | 7/1996 | Piland et al. | 406/190 |
| 5,586,371 | 12/1996 | Thomas | 24/452 |

FOREIGN PATENT DOCUMENTS

| 4111494 | 10/1992 | Germany | 406/190 |
|---|---|---|---|

*Primary Examiner*—Anthony Knight
*Assistant Examiner*—John L. Beres
*Attorney, Agent, or Firm*—Ward & Olivo

[57] ABSTRACT

The present invention relates to glide rings for use with a carrier for transporting articles through pneumatic tube systems, and more particularly, glide rings comprising Velcro® secured plastic or rubber strips to allow efficient replacement of said glide rings. The glide rings have an outer cross-sectional dimension which allow them to engage the inner surface of the passageway of the pneumatic tube system. This provides stability to the carrier and allows the carrier to be moved in response to the controlled air pressure within the passageway. Each of the glide rings has a small width in relationship to the overall length of the closed elongated compartment, and each is located in proximity to the ends of the carrier.

8 Claims, 3 Drawing Sheets

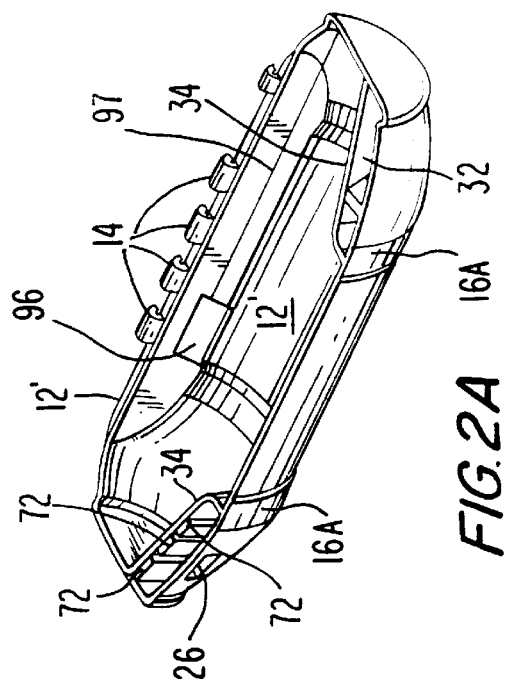
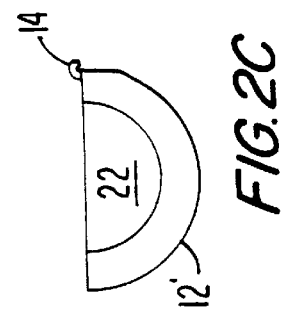
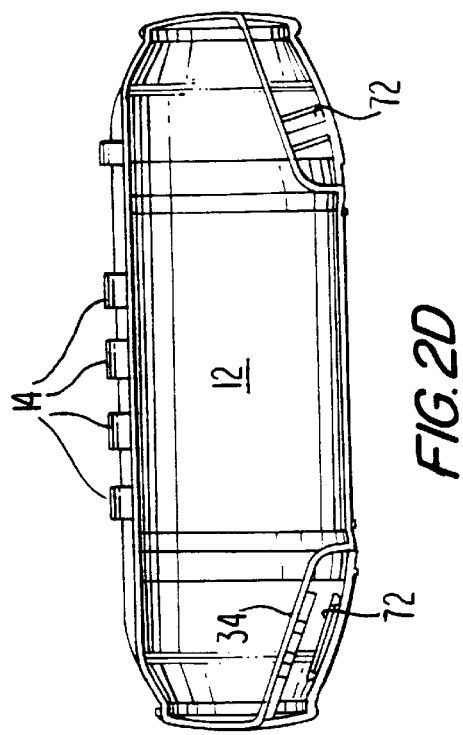
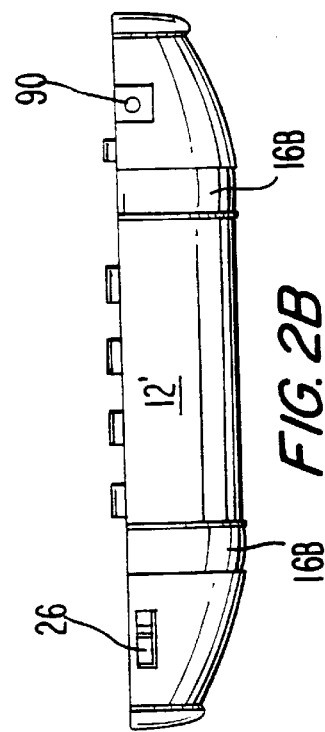

REMOVABLE GLIDE RINGS FOR PNEUMATIC TUBE CARRIERS

TECHNICAL FIELD

This invention relates to pneumatic tube carriers, and more particularly, to a pneumatic tube carrier which includes, as an integral part thereof, glide or accelerator or travel rings comprising Velcro® secured plastic or rubber strips to allow efficient replacement of said glide rings while maintaining the necessary sealing means between the carrier and the passageway of the pneumatic tube system. Such replacement and sealant qualities are necessary in any pneumatic tube system, especially in systems used to transport toxic materials or medicines. In any pneumatic tube system, failure to be properly sealed may cause the carrier (and its contents) to not be timely delivered. In some cases, this could be extremely dangerous. Also, with pneumatic tube systems, though every day use glide rings become worn down and thus need replacement, requiring maintenance, and until replaced, resulting in degraded performance (i.e. less speed, increased power consumption, etc.), and the like.

BACKGROUND ART

The transporting of articles via pneumatic tubes is old and well known. Basically, an object is placed within a container which is then transported by air under either positive or negative pressure from one destination to another. The transport is moved within a closed tube of the same configuration as the carrier extending between the destinations.

One area of commerce which currently uses the pneumatic tube and the transporting of material via the pneumatic tube on a fairly regular basis is the hospital or biomedical research/manufacturing industry. One particular application of this technology is in the area of transporting blood samples, medicines, viral samples or other biological or chemical matter between diverse locations within a hospital or laboratory. In that environment, for example, test tubes are placed within a tube carrier, and are typically secured by foam or clamps within the carrier. The purpose of securing the samples (which are often contained within glass test tubes with rubber stoppers) is to help prevent breakage. When glass breaks or stoppers become dislodged (as can happen when hospital workers fail to properly secure the stopper in the first place), chemical or biological substances can leak into the interior of the carrier.

If the leaking substance is of a large enough quantity, the substance (often a fluid) can leak out of the carrier. In that case, the entire tube transport system could become contaminated with the substance. For example, if a substance (for example, blood, saline or other fluids) were to leak out of a carrier, the substance would interfere with the carriers' efficiency. More specifically, however, fluids escaping from the carrier could make passage of the carrier difficult, resulting in enhanced downtime and increased maintenance expense.

Every day use of the carriers in pneumatic tube systems causes the glide ring seals to become worn, and hence, not maintain the tight, consistent and secure fit within the interior of the carrier tube. As the carriers sometimes reach speeds in excess of 25 feet per second, the rings serve to form an air barrier around the carrier so the carrier does not jam. Also, by minimizing air leakage around the carrier, the rings can minimize the air required to propel the carrier. As the rings become worn with use, the air barrier around the carrier is eliminated and chances of the carrier becoming lodged in the tube increases. Also, it becomes necessary to use much more air pressure to move the carriers at the same rates as with tight, consistent and secure fitting rings.

There exists a need in the field to provide a carrier with accelerator or glide ring seals which are easily replaceable, remain securely attached to the exterior of the carrier, and maintain a tight, consistent and secure fit between the carrier and the interior of the tubes.

There also exists a need in the field to provide a carrier with suitable watertight and airtight properties, such that matter from within the carrier cannot escape to the outside, and matter that has become uncontrollable within the carrier can activate a warning indicator on the exterior of the carrier, so that hospital or other workers who use the carriers will not open carriers that have an activated warning signal, which is indicative of a spill or other abnormal condition within the carrier.

Prior art known to the inventor includes U.S. Pat. No. 4,948,303 to Good, U.S. Pat. No. 4,324,511 to Irish, U.S. Pat. No. 4,219,290 to Golston, U.S. Pat. No. 4,149,685 to Leavelle, and U.S. Pat. No. 3,825,210 to Weaver, which are incorporated herein by reference.

U.S. Pat. No. 4,948,303 to Good discloses a pneumatic tube carrier with a reinforced hinge.

U.S. Pat. No. 4,324,511 to Irish discloses a pneumatic tube carrier with an accelerator ring.

U.S. Pat. No. 4,219,290 to Golston discloses a hinged pneumatic tube carrier with an improved side opening mechanism.

U.S. Pat. No. 4,149,685, granted to Leavelle, Apr. 17, 1979 discloses a pneumatic carrier having identical halves and includes means to adjust the latch mechanism.

U.S. Pat. No. Re. 30,882 granted, Mar. 16, 1982, to Leavelle is directed to an adjustable closure mechanism.

U.S. Pat. No. 3,825,210, granted to Weaver, Jul. 23, 1974 discloses a "clamshell" type pneumatic tube carrier of a bullet configuration wherein the seals which substantially fill the tube are not immediately adjacent the ends but are spaced therefrom.

U.S. Pat. No. 242,459 to Leaycraft Jun. 7, 1881 which discloses a pneumatic tube carrier having asymmetric hinged halves being continuously urged to a closed position by a spring means.

U.S. Pat. No. 359,456 granted to McLaughlin, Mar. 15, 1887 discloses a pneumatic tube carrier including a spindle or the like for wrapping a paper document for security during transportation from one location to another.

U.S. Pat. No. 452,471 granted to Barri, May 19, 1891 discloses a pneumatic tube apparatus wherein an opening in the surface of the container is created by twisting one coaxial section with respect to the other.

U.S. Pat. No. 769,233 granted to Pfluger, Sep. 6, 1904, discloses a cash box for use with a pneumatic tube wherein an opening in the carrier is exposed by relative twisting of the two coaxial elements.

U.S. Pat. No. 811,915 granted to Hager Feb. 6, 1906, discloses a pneumatic tube carrier including a specific stop member to prevent damage to the cylinders when the two coaxial halves are twisted relative to each other.

U.S. Pat. No. 1,169,553 granted to MacMillan, Jan. 25, 1916, discloses a means for securely latching a pneumatic tube carrier such that it does not accidentally open in transport.

U.S. Pat. No. 1,827,000 granted to Duffin Oct. 13, 1931, discloses a container for a roll of paper wherein the exterior container includes a hinge which connects two halves which are identical with the exception of an internal flap on one side for securing the container in a closed condition.

U.S. Pat. No. 2,251,238 granted to Busch, Jul. 29, 1941, discloses a pneumatic carrier wherein the coaxial halves are twisted with respect to each other to expose a window opening and includes a spring actuated locking device.

U.S. Pat. No. 3,401,902 granted to Gouyou-Beauchamps et al, Sep. 17, 1968 discloses a large dimension open top carriage for use in pneumatic conveying of large objects.

U.S. Pat. No. 3,593,948 granted to McClellan, Jul. 20, 1971, discloses a pneumatic carrier wherein identical halves are hinged together along one edge and includes spring means for urging the two halves to a closed cylindrical configuration for transport.

U.S. Pat. No. 3,761,039, granted to Hazell, Sep. 25, 1973 discloses a pneumatic carrier system including means for transferring documents from one individual carrier to another, enabling the use of sharp corners (transfer stations) in the transport tube itself.

U.S. Pat. No. 4,470,730, granted Sep. 11, 1984, to Wutherich discloses a pneumatic tube carrier having a separate pocket means to separate coinage from paper money during transport.

In general, pneumatic tube systems known in the art include a closed continuous passageway having a predetermined inner cross-sectional dimension where the passageway includes a plurality of curves or bends having a predetermined radius. A fluid, such as air, is controllably forced through the passageway in a loop to move a carrier through the passageway. In order for the carrier to move freely through the passageway, the dimensions, and in particular the length, of the carriers being used have been limited by the inner cross-sectional dimension and curvature radius of the passageway. Pneumatic delivery systems are used extensively for the rapid and efficient transportation of a wide variety of articles. These delivery systems are used in a number of business operations, including banks, hospitals, office buildings, industrial plants, and truck terminals as a few examples.

Pneumatic carriers for use in such delivery systems come in a wide range of sizes and shapes to accommodate the physical articles to be transported in the system. As an example, pneumatic carriers are provided for transporting cash, messages, stock transaction slips, letters, blueprints, electronic data processing cards, x-rays, pharmaceutical supplies, and a variety of other small physical objects.

In the past, various mechanisms have been utilized as closure devices for pneumatic tube carriers. For example, many such carriers include an end cap that is hinged with respect to a cylindrical hull on one side of the hull and which has a latch that releasably fastens the end cap to the opposite side of the hull in a closed position. Such carriers employ a variety of fasteners, such as snap fasteners, elastic straps with eyeholes that fit over hooks, or straps that may be secured to bendable posts.

Other types of pneumatic tube carriers are of the side opening variety. One conventional form of such a carrier employs two generally semi-cylindrical sections that are hinged along one longitudinal edge. The hinged sections may be swung toward or away from each other to effectuate opening and closing of the carrier hull. Locking is achieved by virtue of the end caps, which may be twisted to effectuate threaded engagement of the caps onto the carrier hull ends when the hinged hull sections have been closed. That is, the end caps are rotated in such a fashion as to be drawn towards each other onto the ends of the hull, thereby immobilizing the hull sections relative to each other. Rotation of the end caps in the opposite direction releases the hull sections and allows them to be opened.

A preferable configuration utilized by many carrier manufacturers is that of a side opening, wherein the two sides are hinged together, and the two sides are held together when the carrier is closed by use of a hook, or detent or indented type locking lip. Such carriers include latching mechanisms to prevent the door from coming ajar or opening during transit, which could cause the carrier to become lodged in the pneumatic tubes and would also allow the contents of the container to spill out into the tube system. In addition, the instructions for latching such side opening containers or carriers are simple to follow, so that the container can be easily placed within the tube system. Such hinging and locking mechanisms make waterproofing or sealing the carrier a particularly difficult task, as the hinges and locks are embedded within the mold of the carrier, which is generally formed of plastic.

In another type of side opening pneumatic carrier, the access to the carrier is gained by simultaneously pulling and twisting the ends of the carrier to allow the side opening door to be opened. The instructions for such a two-step process are often difficult for many banking customers to follow, and the physical effort and manual dexterity needed to simultaneously pull and twist both ends of the carrier against a spring resistance is often troublesome for many banking customers.

A need has thus arisen for an improved type of pneumatic carrier which overcomes these and other disadvantages associated with the prior art devices. In particular, a need has arisen for a pneumatic tube carrier having easily replaceable glide or travel or accelerator rings which do not interfere with the opening and closing of the carrier. Also, the carrier must be able to maintain its air barrier and tightness within the interior of the tube, despite the fact that it is subjected to a vacuum transport system, and despite the fact that it will be subjected to extreme environmental conditions, such as repeated use, frequent drops, dust and dirt particles, high speed travel, and the like.

Finally, in the past, heat guns were often used to "un-glue" glide rings from their respective tube carriers, as the glide rings had to be well-secured to the carrier. As the carriers proceed through the pneumatic tube carrier systems, they invariably encounter hostile conditions, such as dust, dirt, ruts in the interior tube walls, twists, turns and bends, and so on. Over time, the glide rings wear out, and so, replacement maximizes the performance of the overall system. Thus, replacement should be simplified, while not compromising the strength of the bond between the glide rings and the pneumatic tube carriers. Also, whatever is used to secure the glide ring to the carrier must be of minimal thickness, so the carrier will fit into traditional tubes, without modification as to size.

SUMMARY OF THE INVENTION

The present invention relates to glide rings for use with a carrier for transporting articles through pneumatic tube systems, and more particularly, glide rings comprising Velcro® secured plastic or rubber strips to allow efficient replacement of said glide rings. Of course, other removable securing means can be used, so long as the removal process is minimized, such as Velcro-like materials, or removable yet strong adhesives, that do not leave any residue. Preferably, the glide rings have an outer cross-sectional dimension which allow them to engage the inner surface of the passageway of the pneumatic tube system. This provides stability to the carrier and allows the carrier to be moved in response to the controlled air pressure within the passageway. Each of the glide rings has a small width in relationship to the overall length of the closed elongated compartment, and each is located in proximity to the ends of the carrier.

By way of example, the side opening pneumatic carrier having two semi-cylindrical shells hinged together will be described in detail. Nevertheless, this invention can be readily used for all types of carriers, in all shapes and sizes.

According to a preferred embodiment of the present invention, the two semi-cylindrical shells are designed for movement between an open and a closed position by moving the shells in opposing directions (i.e., closing the shells) to prevent the carrier's insertion in the delivery system in a partially closed position and to prevent the opening of the carrier during transit within the delivery system. The present invention provides an elongated carrier for carrying material having any length or width. For example, the length can be a few or even twelve inches or more, which in accordance with its construction, is capable of being used in conventional pneumatic systems having an inner cross-sectional dimension and curvature radius designed for accommodating carriers of conventional designs. In particular, the carrier of the present invention has a length sufficient for carrying medical, biomedical or any other industrial supplies, as required in each installation, at hospitals, universities, retail outlets, warehouses, etc.

It is, therefore, one object of the present invention to provide an improved carrier capable of carrying elongated materials through conventional pneumatic systems which include a closed passageway having a predetermined inner cross-sectional dimension where the passageway includes curves or bends having a predetermined radius. The conventional systems are designed to accommodate carriers of conventional design with a length limited by the predetermined curvature radius of the passageway.

The carrier, according to the present invention, includes two semi-cylindrical mating, elongated members. The two semi-cylindrical members include a means for securing the members to each other to provide a closed elongated compartment, each of the members having an outer cross-sectional dimension which is smaller than the inner cross-sectional dimension of the passageway so that the elongated compartment can pass through the curves of the pneumatic system without engaging the inner surface of the passageway, and each of the members further including a means for engaging the inner surface of the passageway to accelerate and stabilize the compartment within the passageway, the surface-engaging means having an outer cross-sectional dimension which is generally equal to the predetermined inner cross-sectional dimension of the passageway.

A main object of the present invention is to provide a carrier for use in a conventional pneumatic tube system whereby the exterior surface of the carrier includes one or more removable accelerator or glide rings formed on the perimeter of the both members. The accelerator rings have an outer cross-sectional dimension which allows it to engage the inner surface of the passageway to provide stability to the carrier and allow the carrier to be moved in response to the controlled air pressure within the passageway. Each of the accelerator rings has a small width in relationship to the overall length of the closed elongated compartment, and each is located in close proximity to the tapered closed ends of the carrier. Further, each of the rings is made such that replacement when necessary is quick and inexpensive.

Further, according to the present invention, the ends (which may be tapered) of the carrier can possess frusto-conically shaped and rounded features to facilitate movement of the carrier through the passageway of the pneumatic system. Both members can include elongated intermediate sections formed integrally with smooth and continuous surfaces. Both members include cooperating hinges, locks and overlapping lips for securing themselves to each other, to form an elongated compartment in the direction of the movement of the carrier. By forming a series of supplemental ridges and walls within the carrier, a watertight and/or airtight grommet can be installed and secured within the carrier, to provide a vapor/liquid barrier.

The present invention provides a side opening pneumatic carrier with easily replaceable accelerator rings and which cannot be inserted into the pneumatic tube delivery system in the partially opening condition. The pneumatic carrier will typically be constructed of plastic, and will contain means to secure articles within the carrier during travel. In addition, the pneumatic carrier is designed to prevent opening of the carrier once it is in transit in the pneumatic tube delivery system.

In another embodiment of the present invention, a one piece side opening pneumatic carrier is provided for use in a pneumatic tube delivery system with easily replaceable accelerator rings. The carrier includes two plastic semicylindrical shells having first and second longitudinal edges, a flexible plastic joint integrally formed with the shells, joins the shells together along the first longitudinal edges, such that the shells are rotatable between an open and closed position. In the closed position, the second longitudinal edge of each shell mate together. Because the hinge assembly edges are offset with respect to one another, the two shells mate completely along their periphery.

Also in accordance with the alternate embodiment of the invention, the carrier includes means for securing the shells in the closed position. A raised area on the external face of each of the internal closure pieces, and an indented area is formed in the internal face of the external closure pieces, such that the raised and indented areas are aligned for engaging one another and securing the shells of the carrier in the closed position. A detent or indented lock or clip is used to secure the two halves of the carrier together.

A further object of the invention is the formation of a carrier for a pneumatic tube system from identically shaped generally semi-cylindrical hull sections. The modular production of hull sections in this manner allows the two sections of the carrier hull to be manufactured of plastic, such as polycarbonate, and produced from a single mold. Naturally the requirement for a single mold to produce both hull sections which can be fitted together in a reverse orientation relative to each other reduces the tooling cost for producing carriers according to the invention by 50%. Such tooling costs are considerable in producing a durable hull by injection molding which is the preferred manner of construction.

Yet a further object of the invention is a construction of a carrier hull from plastic. While a plastic carrier is functionally equivalent to conventional steel, aluminum or cardboard carriers in some respects, plastic has the unique characteristic in that it has a certain "memory" for its original shape. That is, if twisted, struck or otherwise subjected to abuse, the plastic of the carrier of the present invention will tend to return to its original shape. In contrast, metal or cardboard carriers, when subjected to heavy use, are frequently permanently bent or distorted, thus detracting from their geometric symmetry and reducing their useful lives. Conventional carriers which are deformed in this way do not maintain a good air seal in the pneumatic line nearly as well as does the present invention. Also, conventional carriers which have been bent or distorted frequently open in the carrier line during use, thus necessitating the closure of the pneumatic tube system as aforesaid. The embodiment of the present invention is such that it is suitable for use with any of the above described preferred carrier structures.

There are numerous criteria used in designing a carrier for pneumatic systems. The carrier should preferably be light, inexpensive and foolproof. Also, the carrier should be arranged so that it cannot be entered into a tube system when in an open position or open while in the tube. Such an arrangement ensures that the carrier is closed before it is entered into the system thereby limiting the possibilities that the carrier contents will be lost in the system and that the carrier will become lodged in the system. The carrier should preferably also be capable of carrying a maximum length of materials around given bends in the system and be capable of being locked in a closed position. Furthermore, in accordance with the present invention, the carrier should preferably comprise easily replaceable, yet durable, accelerator rings.

According to a particular embodiment of the present invention, a carrier is provided having first and second shells disposed about a longitudinal axis and connected by hinges such that the shells are moved transversely relative to one another when opening and closing the carrier, and more particularly, containing a pair of removable ring seals (preferably made of Velcro®) intermediate the ends of the carrier for guiding the carrier through a pneumatic tube system, for limiting air seepage past the carrier, and for allowing quick and easy maintenance and/or replacement. End portions of the carrier are tapered to terminate in bumpers and a pair of latches are coupled to the shells for retaining the carrier in a closed position. A lock is provided for combining with the closed shells to prevent unauthorized opening of the carrier.

Of course, any removable material may be used as a glide or accelerator ring, so long as the ring does not become dislodged during the tube travel. Also, as adhesives have traditionally been problematic, the use of material, such as Velcro is preferred, although the present invention may include the use of suitable adhesives, wherein said adhesive is easy to remove with a particular solvent, while rigorous enough to secure the ring during tube travel.

BRIEF DESCRIPTION OF THE DRAWING

The invention will be better understood with reference to the following drawings, in which:

FIG. 2A shows the interiors of both halves of a carrier according to the present invention;

FIG. 2B is a side view of a half of a carrier according to the present invention;

FIG. 2C is an end view of a carrier according to the present invention;

DETAILED DESCRIPTION OF THE PREFERRED EMBODIMENT

The preferred embodiment of the present invention is set forth below.

Figure 1:
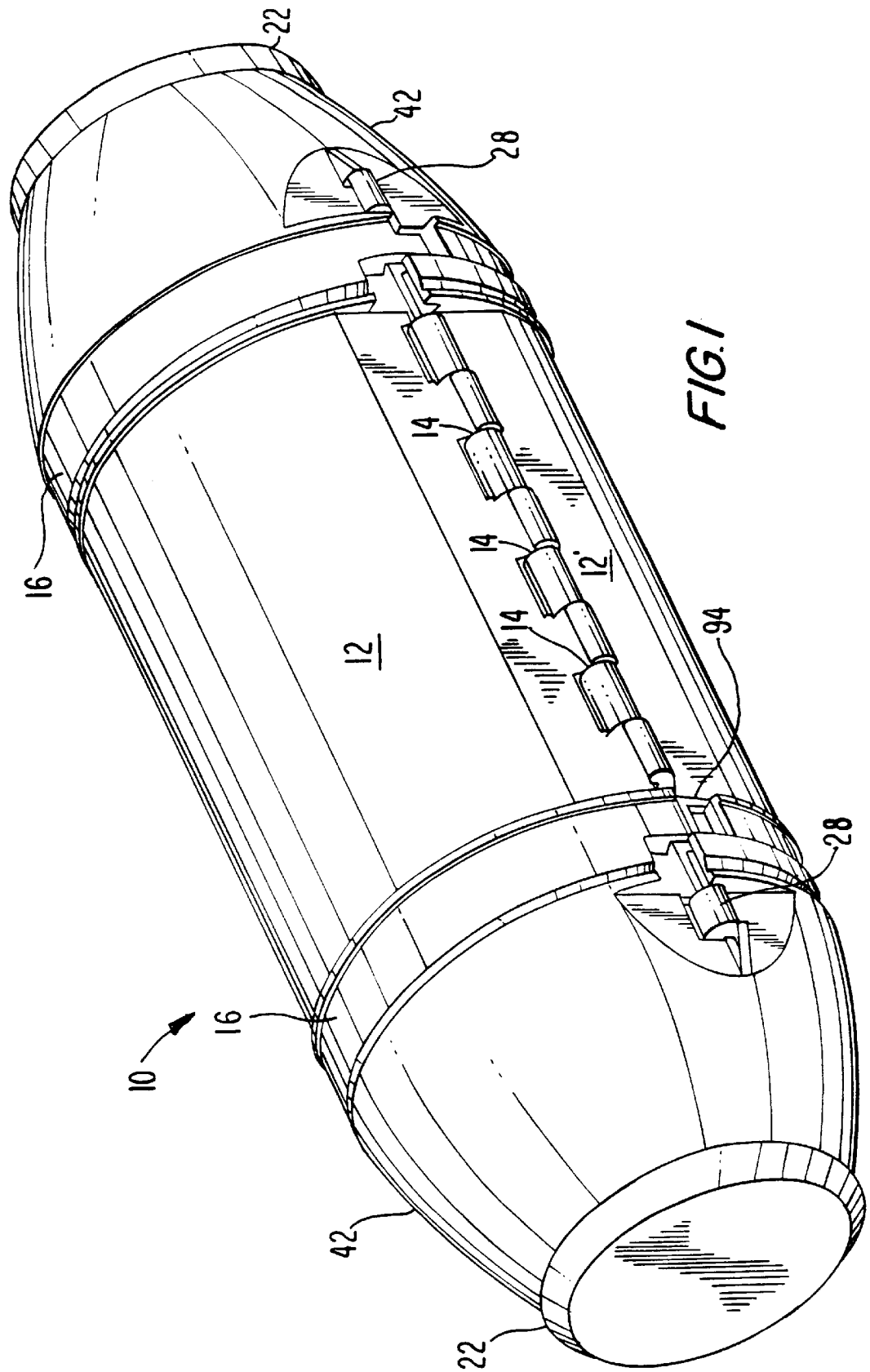
FIG. 1, which is a perspective view of a carrier according to the invention and illustrated in a closed position.

FIG. 1 is an overall view of a carrier according to the present invention. FIG. 1 shows a carrier 10 consisting of first and second shells 12, 12' which extend longitudinally and which are interconnected by hinges 14 and rod locking members 28. Members 28 lock the rod in place, so that hinges 14 can provide for the opening and closing of the carrier 10 halves 12 and 12'. The carrier 10 halves 12 and 12' are formed of plastic, for example, and raised areas are formed along the exterior surface, around the transverse perimeter of the carrier, and shown as the glide or accelerator rings 16. At least two accelerator or glide or travel rings 16 are used for each carrier 10, and according to the preferred embodiment of the present invention, consist of Velcro® secured plastic or rubber strips. A suitable felt material or Neoprene® material may also be used to make the seals 16, which may also be cut from a sheet of the material such that moisture will tend to cause dimension changes substantially in the direction longitudinal with respect to the carrier, rather than radially.

Each accelerator ring seal 16 consisting of the Velcro® secured means is actually comprised of two semi-circular rings (16A & 16B), as shown in FIG. 2. Also each semi-circular ring 16A & 16B can be formed of a multi-ply ring, including an inner ring that may be adhesively attached to the carrier, and an outer ring which attaches to the outside of the inner ring and is attached through the Velcro® securing means. The outer side of the outer ring is made of a suitable plastic or rubber strip. Inner rings of seals 16 may be adhesively attached to the shells 12 and 12' at respective raised or even indented portions—indented enough to compensate for the thickness of the Velcro fastener semi-circular ring.

The purpose of rings 16 is so that carrier 10 forms a tight, consistent and secure fit within the interior of the carrier tubes, so that the carrier 10 may travel effectively through the carrier tubes. As the carriers 10 often reach speeds in excess of 25 feet per second, the rings 16 serve to form an air barrier around the carrier 10, so that the carrier 10 does not jam. Also, by minimizing air leakage around the carrier 10, rings 16 can minimize the air required to propel carrier 10. Felt insert 94 (in FIG. 1) may be provided, as well, so that the rings 16 appear as continuous concentric circles—and no air can escape through the seal the rings 16 form in relation to the interior of the carrier tubes, even where the hinge assemblies 14 are concerned. Ends of the carrier are defined by respective resilient bumpers 22. Each of the bumpers 22 is preferably larger than half the diameter of the pneumatic tube to avoid possible jamming of one carrier 10 with a second carrier within the pneumatic tube. The shells 12 and 12' are substantially identical in shape and are preferably molded in the same or a similar mold form from a suitable plastic material such as LEXAN® (a trade mark for a polycarbonate plastic sold by GE Plastics). Pairs of ring seals 16 are attached to the shells 12 and 12' for guiding the carrier through a pneumatic tube system. These seals also limit air seepage past the carrier.

In order to simplify description, parts of shell 12 will be described, but it should be understood that corresponding parts of shell 12' also may exist. The shell 12 is generally semi-cylindrical over the major portion of its length, with exception, for example, of the raised portions under rings 16. those raised portions may also correspond to internally concaved zones, which may contribute to the overall structural integrity of the carrier 10.

The portions of carrier 10 that support the seals 16 are positioned intermediate the ends of the carrier 10 at positions which maximize the available length and diameter dimensions of the carrier 10. The shells 12 and 12' further include tapered or frusto-conical end portion 42.

Hinge assemblies 14 are preferably molded to the shells 12 and 12' and the pivot points of the hinges are offset from mating edges of the shells 12 and 12' to permit the ends of the rings 16 and shells 12 and 12' to securely mate together when closed, without damage to the seal halves 16. The hinges 14 are preferably located so that they will not contact the interior of the carrier tube walls. Although the carrier tube walls are often made of steel, and the carriers 10 are often made of plastic, it is generally desirable to have only smooth, continuous surfaces contacting the interior of the pneumatic tube walls. For example, if a metallic hinge 14 were to scratch the interior of the carrier tube wall, ruts could result, which will facilitate air seepage, and a loss of system efficiency, as air passes through said ruts.

Carrier 10 is capable of carrying papers, such as drawings, X-ray negatives and the like. Carrier 10 is often used to carry vessels, wherein the vessels often contain liquid, solid or gaseous materials that should ideally remain within the vessels. That is, the carrier 10, which moves at high speeds, is often used to carry vessels that contain various liquid substances, which are prone toward leaking out of the carrier 10, if the vessels should break within the carrier 10, or should the vessels become opened in transit (because, for example, a rubber stopper was not securely seated in the first place, or otherwise failed). Specifically, when the carrier is used for transporting liquid substances, problems can result when vessels break or open within the carrier 10. The liquid substances can escape carrier 10 and interfere with the transit of carrier 10 by building up on seals 16. But, through use of the Velcro® securing means with inner ring and outer ring, necessary replacement of seals 16 due to a build up of an undesirable substance is quick and inexpensive.

It will be appreciated that although the above description is limited to a generally cylindrical carrier, the invention is applicable to carriers having any suitable cross-section. For instance, carriers having a generally oval cross-section have been used, and the invention is intended for use in carriers of this and other shapes.

In FIG. 2, semi-circular rings 16A are each fastened to the top of the carrier 12, while semi-circular rings 16B are each fastened to the bottom of the carrier 12'. The specific configuration is unimportant to the present invention. What is important is that the rings 16, in general, form perfect (that is, air tight) perimeter seals, so that air cannot pass, and so that carriers 12 in general are propelled through the tubes. To accomplish that, the rings 16, which may consist of Velcro bands with rubber uppers, and a reciprocating Velcro anchor, glued or otherwise permanently fastened to the carrier 12, can provide a removable glide ring. For example, in the above configuration, a first Velcro strip has a rubber surface which contacts the tube walls. Then, its opposite Velcro surface mates with a second Velcro strip. That second Velcro strip in turn has an opposite side which is permanently secured or anchored to the carrier 12. In this configuration, the first Velcro strip is removable, and disposable, so that whenever a carrier 12 needs a new glide ring 16, then, only the first Velcro strip need be replaced, and then, without the need to do anything more than affix a new Velcro strip.

Over time, the second Velcro strip 16 (affixed permanently to the carrier) will wear out, as Velcro that is repeatedly pushed together and pulled apart does. In that case, the second Velcro strip can be removed, by heating up the glue which anchors it to the carrier. In that case, the traditional method of glide ring replacement is practiced, but with the present invention, the occurrence of that process is greatly minimized, as the glide rings themselves need only be replaced via replacement of the outer Velcro strip, and the reciprocating Velcro strip beneath that (secured permanently to the carrier 12), need only be replaced much less often. Hence, the present invention embodies the advantages of simple replaceability, minimal downtime, system optimization (increased motivation to replace glide rings more frequently, which promotes system integrity), and increased reliability. Without the present invention, the rings 16 must constantly be replaced by loosening the adhesive between the ring 16 and the carrier 12. With the present invention, a two-ply (or as many layers as desired) material can be used to form rings 16, wherein the inner surface mates with the carrier 12, the outer surface contacts the interior surface of the pneumatic tube, and what comes in between the outer and inner surfaces of the glide rings 16 can be any separable medium, such as Velcro, magnetized layers, removable adhesive, interlocking fabrics (similar in function to Velcro), snaps, rivets, or other fasteners that maintain a secure and smooth fastening relationship between the outer and inner surfaces of rings 16.

Figure 3:
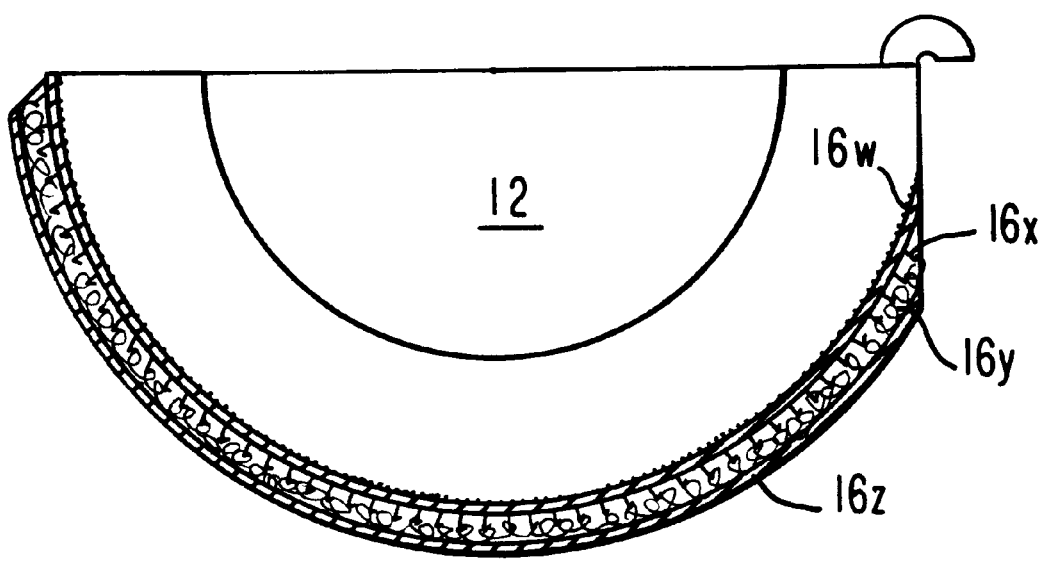
FIG. 3 shows the accelerator or glide rings according to the present invention.

One example of such an embodiment is shown in FIG. 3. In that figure, one semi-circular glide ring 16 (e.g., 16a & 16b) according to the present invention is shown as 16w, 16x, 16y and 16z. In FIG. 3, a glide ring 16 is shown with its components parts 16w, 16x, 16y and 16z, affixed to carrier 12. In that embodiment, 16w and 16x comprise a Velcro strip, per se, and 16y and 16z comprise a second Velcro strip. There, 16w is a surface that is permanently affixed to the carrier 12, with, for example, epoxy. Such a layer of epoxy may be truly permanent, or alternatively, it may be dissolvable, so that the 16w/16x strip can be replaced. The 16w surface contacts and is affixed to the carrier 12, while surface 16x is a layer of Velcro (either the fuzzy end, or the hooked end designed to stick to the fuzzy end). Preferably, 16w and 16x may be formed of a single strip of plastic or Neoprene, with suitable layers affixed thereto. For example, surface 16w must be sufficiently resilient to last a reasonable period of time, and sufficient to mate strongly with the surface of 16x, which is either Velcro or a surface that supports Velcro. In practice according to the present invention, the 16w/16x strip is not usually removable, and can only be removed by authorized service personnel, who can, for example, melt or dissolve the glue between surface 16w and the carrier 12. As carrier 12 is often made of a polymer, an adhesive must be chosen that does not ruin the surface of the carrier 12.

Also, in FIG. 3, the second Velcro strip is shown, which includes 16y and 16z. 16y is the Velcro surface that mates with 16x, while 16z must be soft and non-porous enough to trap air when disposed against the interior wall of a pneumatic tube. In practice, 16z is the wearable surface, and it is this surface that endures the tremendous friction as the carrier 12 is propelled through a pneumatic tube system. As surface 16z wears thin, the entire strip 16y/16z can be separate from 16w/16x, and can be discarded. Then, replacement strips 16y/16z can be affixed into place. Thus, downtime is minimized, and system reliability is dramatically increased.

While the foregoing embodiments of the invention have been set forth in considerable detail for the purposes of making a complete disclosure of the invention, it will be apparent to those of skill in the art that numerous changes may be made in such details without departing from the spirit and the principles of the invention.

We claim:

1. Removable ring seals for use with a carrier for transporting articles through tubes of a pneumatic tube system, said ring seals generally conforming to the radial shape of said carrier, each of said ring seals comprising an inner pair of ring seal halves which attach to the shells and an outer pair of ring seal halves which attach to said inner pair of ring seal halves, one of said inner pair being attached to a respective one of the shells for engagement with the other of said inner pair with the shells in the closed position, and said outer pair of ring seal halves removably secured to said inner pair, the ring seal halves being spaced from respective end portions of the carrier and proportioned for guiding the carrier in the tube system and for limiting air seepage past the carrier.

2. Removable ring seals as claimed in claim 1, wherein said outer pair of ring seal halves are secured to said inner pair of ring seal halves by means comprising hook and loop fastening device.

3. Removable ring seals for use with a carrier for transporting articles through tubes of a pneumatic tube system, said ring seals generally conforming to the radial shape of said carrier and positioned intermediate the ends of said carrier, each of said ring seals comprising:

a first element having an inner surface and an outer surface; and a second element having an inner surface and an outer surface;

wherein said inner surface of said first element is adhesively attached to said carrier, wherein said second element is independent of said first element, wherein said inner surface of said second element comprises a removably securing means such that said inner surface of said second element is removably secured to said outer surface of said first element, and wherein said first element and said second element each have at least one slit.

4. Removable ring seals as claimed in claim 3, wherein said outer surface of said second element acts as a pressure and vacuum seal for the transmission of said carrier through said pneumatic tube system, wherein said outer surface of said first element comprises the loop component of a hook and loop fastening system and wherein said inner surface of said second element comprises the hook component of a hook and loop fastening system.

5. Removable ring seals as claimed in claim 3, wherein said outer surface of said second element acts as a pressure and vacuum seal for the transmission of said carrier through said pneumatic tube system, wherein said outer surface of said first element comprises the hook component of a hook and loop fastening system and wherein said inner surface of said second element comprises the loop component of a hook and loop fastening system.

6. Removable ring seals as claimed in claims 4 and 5, wherein said outer surface of said second element comprises a soft, non-porous material.

7. Removable ring seals as claimed in claims 4 and 5, wherein said outer surface of said second element comprises a plastic or rubber material.

8. Removable ring seals as claimed in claim 3, wherein said first element and said second element each have two slits positioned corresponding to the joints of the carrier.

* * * * *